Figure 1:
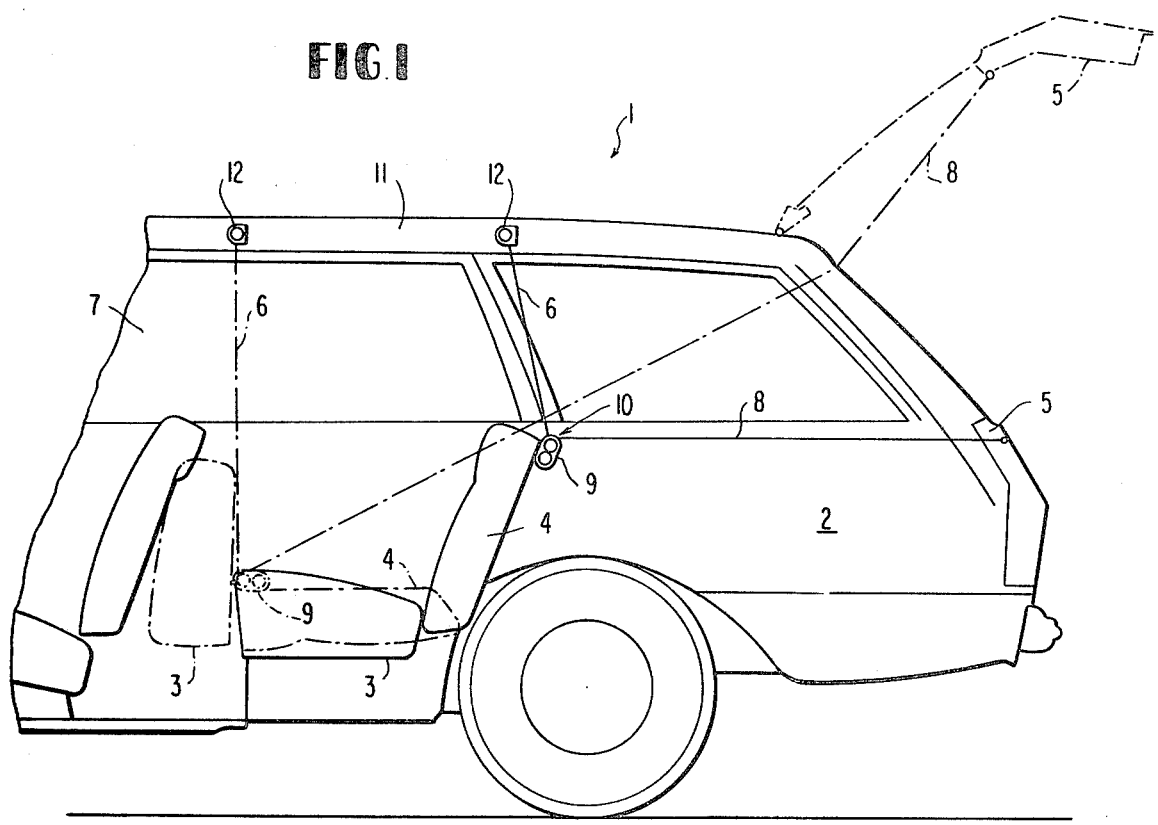

United States Patent [19]

Breitschwerdt et al.

[11] 4,202,577
[45] May 13, 1980

[54] MOTOR VEHICLE PROVIDED WITH A HATCH-BACK DOOR CLOSING OFF A STORAGE SPACE

[75] Inventors: Werner Breitschwerdt, Stuttgart; Rudolf Andres, Sindelfingen; Werner Heiss, Doffingen; Wolfgang Fussnegger, Gartringen, all of Fed. Rep. of Germany

[73] Assignee: Daimler-Benz Aktiengesellschaft, Fed. Rep. of Germany

[21] Appl. No.: 938,364

[22] Filed: Aug. 31, 1978

[30] Foreign Application Priority Data

Sep. 3, 1977 [DE] Fed. Rep. of Germany ....... 2739741

[51] Int. Cl.² ............................................... B60R 7/00
[52] U.S. Cl. ................................ 296/24 R; 280/749; 296/37.16; 296/106
[58] Field of Search ............... 296/24 R, 37.16, 78 R, 296/136, 141, 142, 143, 100, 98, 106; 280/748, 749

[56] References Cited

U.S. PATENT DOCUMENTS

| | | | |
|---|---|---|---|
| 1,280,272 | 10/1918 | Montroy | 296/141 |
| 1,406,499 | 2/1922 | Sanberg | 296/142 |
| 3,891,263 | 6/1975 | Orsulak | 296/24 R |
| 3,909,060 | 9/1975 | Katayama | 296/24 R |
| 4,127,301 | 11/1978 | Syrowik | 296/37.16 |

Primary Examiner—John J. Love
Assistant Examiner—John A. Carroll
Attorney, Agent, or Firm—Craig & Antonelli

[57] ABSTRACT

A motor vehicle provided with a hatch-back door closing off a storage space, in which two blinds arranged in a common housing are provided whose axes of rotation extend in the transverse direction. The blind serving the separation of the passenger space from the storage space is adapted to be suspended in its pulled-out position within the roof area, while the free end of the blind serving to cover the stored items is fastened within the area of the hatch-back door.

10 Claims, 2 Drawing Figures

MOTOR VEHICLE PROVIDED WITH A HATCH-BACK DOOR CLOSING OFF A STORAGE SPACE

The present invention relates to a motor vehicle provided with a hatch-back door closing off a storage space, especially to station wagons, whose storage space is adapted to be separated off from the passenger space by a blind.

A space separator between the front seats and the rear space is already disclosed in the German Gebrauchsmuster No. 76 34 005, which consists of a screen element secured at a vehicle side wall, adapted to be pulled-out in the vehicle cross-direction and adapted to be hung-in at the opposite vehicle wall.

However, it is disadvantageous with this prior art arrangement that both the separating element disposed in its normal position as also the fastening device mounted at the oppositely disposed vehicle wall have a displeasing effect and may present a danger of injury for the passengers.

The present invention is therefore concerned with the task to avoid the aforementioned disadvantages and at the same time to create a possibility to separate off a storage space located in the rear part of the vehicle not only toward the front but also over a part of its height in the upward direction.

Furthermore, the present invention prevents, in a meaningful manner that, notwithstanding the separation of the passenger space from the storage space by the blind provided therefor, stored items from entering into the passenger space under certain conditions.

The first part of the underlying problems is solved according to the present invention in a motor vehicle of the aforementioned type in that two blinds, arranged in a common housing, are provided, each of which have an axis of rotation which extends in the vehicle transverse direction, and in that the blind serving the separation of the passenger space is adapted to be hung-in or suspended in its pulled-out position within the roof area whereas the fastening of the free end of the blind serving the covering of the stored items is located within the area of the hatch-back door.

In a preferred embodiment of the present invention, the free end of the blind serving to cover the cargo or stored items is adapted to be secured at the hatch-back door. Since in that case the free end of this blind pivots up in unison during the opening of the hatch-back door, a loading and unloading is possible without disconnection and winding-up of the blind.

According to a further feature of the present invention, advantages are obtainable with a motor vehicle in which the backrest of the rear seat is adapted to be pivoted forwardly for increasing the storage space, if the housing receiving the blinds is secured at the backside of the backrest within the area of the upper edge thereof. In that case, with a forwardly tilted backrest, the housing accommodating the blinds is then located automatically at the most favorable place and the blind which now separates off the reduced passenger space from the increased storage space, can now be pulled-out upwardly approximately vertically and the free end thereof can be hung or suspended within the roof area in correspondingly further forwardly arranged receptacle or fastening means.

The second part of the underlying problems is solved according to the present invention in that an installation is provided according to the present invention which prevents, when the blind serving the separation of the passenger space from the storage space is not fully pulled-out in its entire length in its position secured within the roof area, that at least with a strong vehicle deceleration and/or with a loading and stressing of the blind by stored items coming from the rear, a further pulling out of the blind takes place.

It may thereby be appropriate if the blind serving the separation of the passenger space is formed by a net or the like, and if projections in the form of teeth or the like are provided within the area of the pulled-out shaft or compartment of this blind, which engage in the apertures, recesses or the like, at least when the blind is loaded or stressed by stored items coming from the rear, and thereby prevent a further pulling out of the blind.

Accordingly, it is an object of the present invention to provide a motor vehicle equipped with a hatch-back door closing off a storage space which avoids by simple means the aforementioned shortcomings and drawbacks encountered in the prior art.

Another object of the present invention resides in a motor vehicle equipped with a hatch-back door which closes off a storage space, in which the suspension or fastening means for a separator do not act disturbing to the eye of the observer or user of the vehicle.

A further object of the present invention resides in a motor vehicle of the type described above in which not only the dangers of injury for the passengers are materially reduced but which is at the same time simple in construction, utilizes relatively few parts and involves low expenditures.

Another object of the present invention resides in a motor vehicle equipped with a hatch-back door closing off a storage space which makes it possible to separate off a storage space disposed in the rear part of the vehicle not only with respect to the passenger space of the vehicle located in front thereof but also upwardly over a part of its height to cover off the stored items or cargo from above.

A further object of the present invention resides in a motor vehicle of the type described above which effectively prevents stored items from entering the forward passenger space under certain circumstances such as, for example, a strong deceleration of the vehicle.

Figure 2:
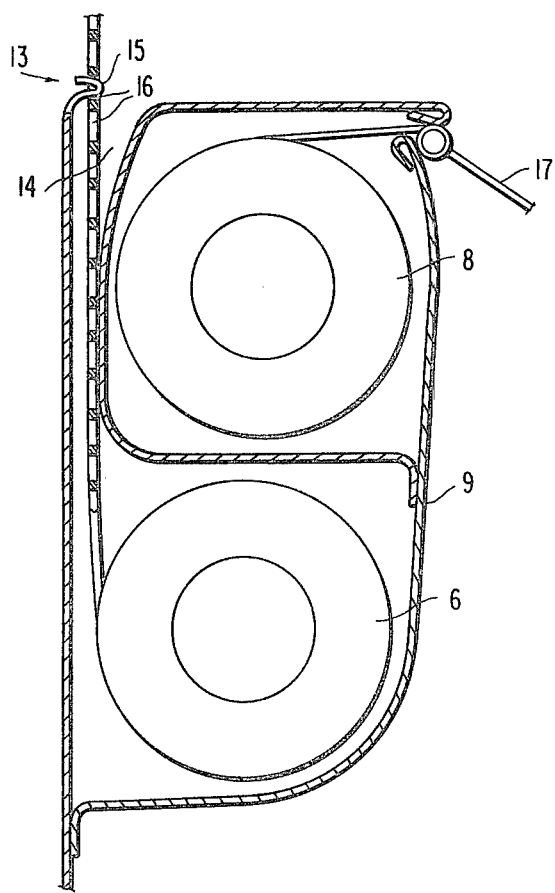

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic simplified side view of the rear area of a station wagon motor vehicle with the possible extension directions of the two blinds in accordance with the present invention; and FIG. 2 is a cross-sectional view, on an enlarged scale, through the housing accommodating the blinds and through the blind serving the separation of the passenger space and held fast by teeth in accordance with the present invention.

Referring now to the drawing wherein like reference numerals are used throughout the two views to designate like parts, in a rear area of a station wagon motor vehicle 1, illustrated in a simplified manner in FIG. 1, whose a storage space 2 is enlarged by the forward tilting of the rear seat 3 and by folding over the associated backrest 4 and can be closed off by a hatch-back door 5. The storage space 2 is separated off with respect to the passenger space 7 by a first blind 6 and the stored items or cargo (not shown) are separated off with respect to the remaining storage space 2 by a second blind 8.

Both blinds 6 and 8 are, as illustrated in FIG. 2, accommodated by a common housing 9 which is arranged at the backrest 4 of the rear seat 3 within the area of the upper edge 10 thereof and thus follows the folding movement of the backrest 4. If the rear seat 3 and the backrest 4 thereof is in the use position illustrated in full line in FIG. 1, then the blind 6 extends toward the rear fastening means 12 arranged in the roof area 11. Since the blind 6 is not fully pulled-out in this position, a mechanism generally designated by reference numeral 13 is provided according to FIG. 2, which prevents, at least during strong vehicle decelerations and/or during loads on the blind 6 by cargo coming from the rear, a further pulling-out of the blind 6. In its simplest construction of this mechanism 13, projections 15 in the form of teeth are arranged within the pull-out shaft 14 of the blind 6, which with a corresponding loading of the blind 6, provided with apertures 16 or the like at least within the area coordinated to the teeth, lockingly engage in the thus created interstices.

For purposes of increasing the storage space 2, the rear seat 3 and the backrest 4 can be transferred into the position illustrated in dash and dotted lines in FIG. 1. The now fully pulled-out blind 6 is suspended in further forwardly arranged fastening means 12. The mechanism 13 is thereby inoperable since by reason of the fully pulled-out blind, no further pulling-out is possible even in case of loading thereof by a stored item.

The blind 8 serving to cover off the stored items or cargo is provided according to FIG. 2, with a free end 17 which will be hung or suspended at the hatch-back door 5. During the pivoting of the hatch-back door 5 into the position illustrated in dash and dotted lines in FIG. 1, an automatic additional pull-out of the blind 8 takes place so that the storage space is conveniently accessible.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A motor vehicle provided with a hatch-back door closing off a storage space, and first means adapted to separate the storage space from a passenger space, characterized in that the first means includes a first retractable blind means adapted to be fastened in an extended position within a roof area of the motor vehicle, means are provided for covering off a stored item in the storage space including a second retractable blind means having a free end fastened within an area of the hatch-back door, the first and second blind means each have an axis of rotation which extends at least approximately in a transverse direction of the motor vehicle, and in that means are operatively connected with the first blind means for preventing the first blind means when not fully extended from being further pulled out by one of a strong deceleration or a striking by items stored in the storage space.

2. A motor vehicle according to claim 1, characterized in that the the first and second blind means are arranged in a common housing means.

3. A motor vehicle according to claim 2, characterized in that the free end of the second blind means is adapted to be fastened to the hatch-back door.

4. A motor vehicle according to claim 2, with a rear seat having a backrest of which is pivotal forwardly to increase the storage space, characterized in that the housing means accommodating the blind means is secured at a backside of the backrest within an area of the upper edge thereof.

5. A motor vehicle according to claim 4, characterized in that the first blind means is formed by a net-like structure, and in that said preventing means include teeth-like projections arranged within a pull-out area of said first blind means which are adapted to engage in complementary openings provided in the first blind means when the first blind means is loaded by a stored item coming from the rear thereby preventing a further pulling-out of the first blind means.

6. A motor vehicle according to claim 5, characterized in that the motor vehicle is a station wagon.

7. A motor vehicle according to claim 1, characterized in that the free end of the second blind means is adapted to be fastened to the hatch-back door.

8. A motor vehicle according to claim 2, with a rear seat having a backrest of which is pivotal forwardly to increase the storage space, characterized in that the housing means accommodating the blind means is secured at a backside of the backrest within an area of the upper edge thereof.

9. A motor vehcile according to claim 1, characterized in that the first blind means is formed by a net-like structure, and in that said preventing means include teeth-like projections arranged within a pull-out area of said first blind means when the first blind means is loaded by a stored item coming from the rear thereby preventing a further pulling-out of the first blind means.

10. A motor vehicle according to claim 2, with a rear seat having a backrest of which is pivotal forwardly to increase the storage space, characterized in that the housing means accommodating the blind means is secured at a backside of the backrest within an area of the upper edge thereof.

* * * * *